June 21, 1966 W. DE RIDDER 3,257,017
APPARATUS FOR DEPANNING BREADLOAVES
Filed May 8, 1964 3 Sheets-Sheet 1

June 21, 1966    W. DE RIDDER    3,257,017
APPARATUS FOR DEPANNING BREADLOAVES
Filed May 8, 1964    3 Sheets-Sheet 2
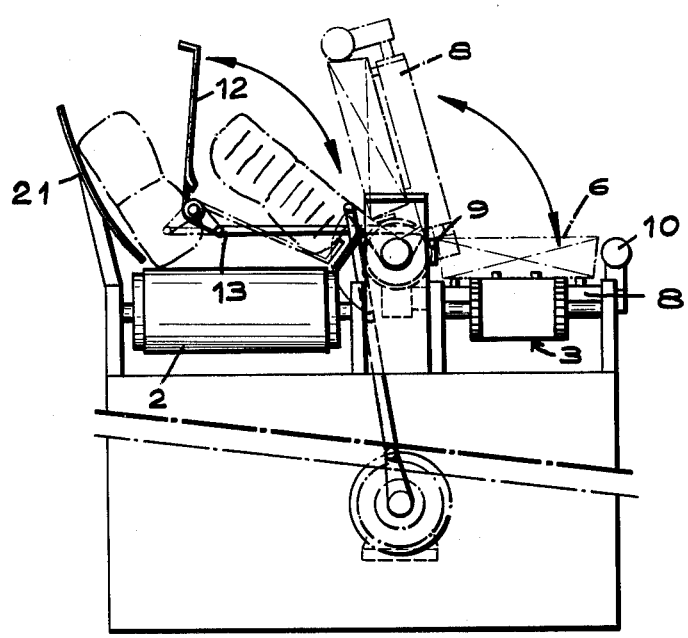
INVENTOR.
BY

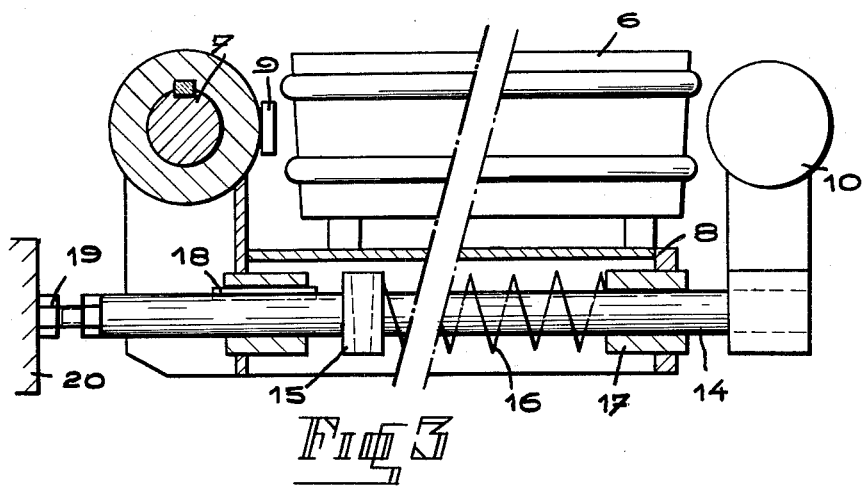
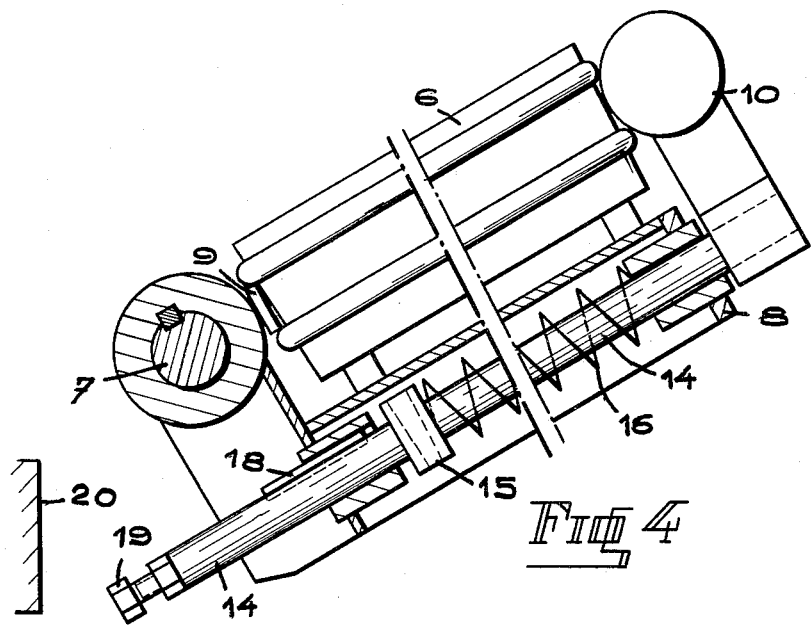

United States Patent Office 3,257,017
Patented June 21, 1966

3,257,017
APPARATUS FOR DEPANNING BREAD LOAVES
Willem de Ridder, Voorschoten, Netherlands
Filed May 8, 1964, Ser. No. 366,014
Claims priority, application Netherlands, May 8, 1963, 292,492
2 Claims. (Cl. 214—314)

The present invention relates to an apparatus for depanning bread loaves of the type comprising a delivery conveyor for the pans to be emptied, a turnover device in the path of this delivery device adapted to move in a vertical plane so as to be swung into a position above a discharge conveyor, and means for putting the empty pans on a second discharge conveyor.

In a well-known apparatus of this kind the plane in which the turnover device can swing is parallel to the direction of delivery of the pans to be emptied. In this apparatus the turnover device is constituted by a platform which is normally aligned relatively to the upper run of an endless delivery conveyor but may be swung about an axis adjacent its end remote from the delivery conveyor. During the swinging motion of the platform the loaded pans are held thereon by means of a grid-like member which is pivoted on the same axis as the platform and which is adapted to press on the bread loaves. In the inverted position the pans, usually united into groups or "couples" of four pans, become supported on a fork-shaped arm which is swingable about an axis parallel to that of the platform, whereas the grid-like member together with the loaves may swing further between the legs of this arm until the loaves arrive in a position in which they may slide from the grid onto a discharge conveyor. In the meantime the group of unloaded pans, after the platform has been swung back, is pressed in the fork-shaped supporting arm by means of a pivotable pressing arm and then tipped over once more so as to put it on a discharge conveyor in alignment with the delivery conveyor.

Thus in this well-known apparatus there is a separate turnover device for picking up the unloaded pans and putting same on a pan discharge conveyor. This makes the whole apparatus rather complicated and less reliable in operation. Moreover, the turnover devices are also relatively complicated in themselves due to the arms and platforms, respectively being turnable independently of each other.

It is an object of the present invention to improve this apparatus so as to overcome the above disadvantages. The apparatus of the present invention comprises a delivery conveyor for the pans to be unloaded, a turnover device in the path of this delivery conveyor adapted to move in a vertical plane perpendicular to the direction of movement of the delivery conveyor so as to be swung into a position above a discharge conveyor and means for putting the unloaded pans on a second discharge conveyor, the turnover device being provided with means for laterally clamping the pans to be unloaded. With this construction only one turnover device is needed. When the turnover device is laterally swung and tipped over the loaves will simply fall out of the pans, e.g. on a discharge conveyor disposed parallel to or obliquely under the delivery conveyor, while the unloaded pans are still held by the clamping means in order to be swung back by the turnover device. After having been swung back the clamping means are released, after which the unloaded pans are taken along and discharged in the initial direction of movement.

In accordance with a further feature of this invention the clamping means are constituted by a pair of cooperating jaws which are constructed to be normally urged away from each other against spring action but are moved towards each other as by spring action when the turnover device is moving from its rest position.

In a preferred embodiment, in which, just as in the well-known device, an e.g. swingable platform is used as a turnover device, one of the jaws takes a fixed position on said platform whereas the second jaw at the opposite side of the platform is mounted on a transverse rod slidably mounted under the platform, the free end of said rod engaging an abutment when the platform is in its rest position, said abutment normally preventing the movable jaw from moving towards the fixed jaw but releasing said movable jaw when the platform is swung out of its rest position.

This embodiment, in which the two jaws are bridged by a member passing under the conveyance surface is to be preferred to an embodiment in which the clamping means are bridged by one or more arms extending over the conveyance surface. It is true that in the latter embodiment the delivery of the loaded pans and the discharge of the unloaded pans may be effected by the same conveyor, but against this is the disadvantage that, when a couple of pans would move a little too far before being engaged by the turnover device, the loaves could strike the said bridging arms when falling out of the pans. Besides the application of separate conveyors for delivery of the loaded pans and discharge of the unloaded pans in the preferred embodiment makes it possible to discharge the unloaded pans at a higher speed than that at which the loaded pans are delivered to the turnover device.

In order that the loaves may arrive on their discharge conveyor in their upright position, i.e. with their bottoms contacting the conveyance surface, in accordance with a further feature of this invention the swingable platform is coupled with a guiding plate disposed above the discharge conveyor and adapted to be swung from a substantially horizontal receiving position corresponding with the inverted position of the platform into a delivery position towards a slide plate slanting laterally towards the discharge conveyor.

In order to effect automatic engagement and swinging of the loaded pans at the right moment without being hindered by preceding or following pans, there is a switch device in the delivery path of the loaded pans, adapted to be actuated by the arriving pans so as to put a blocking device into operation, which prevents the delivery of further pans until the preceding couple of pans, after being unloaded and swung back, has been discharged. The blocking device conveniently comprises an electrically controlled member constructed to prevent delivery of pans as long as it is not energized.

Preferably in the discharge path for the unloaded pans there is an auxiliary switch adapted to put the blocking device out of operation as soon as it is depressed by a passing unloaded pan. Preferably in the path of the still loaded pans there is provided a second switch device adapted to be also actuated by the pans so as to put the turnover device into operation and to put the latter out of operation as soon as the concerning pan, after being unloaded and swung back, depresses the actuating member of said second switch device for the second time.

Other objects and advantages of the invention will become apparent from the following description of a preferred embodiment of the present apparatus with reference to the accompanying drawings in which:

FIG. 2 is a front view of the apparatus shown in FIG. 1;

FIG. 3 is a fragmentary cross section through the turnover device in its rest position, showing a couple of pans in a position between the clamping jaws the latter being not yet operative and FIG. 4 is a cross section similar to that of FIG. 3 but showing a position in which the couple of pans is effectively held between the cooperating jaws of the turnover device.

Figure 1:
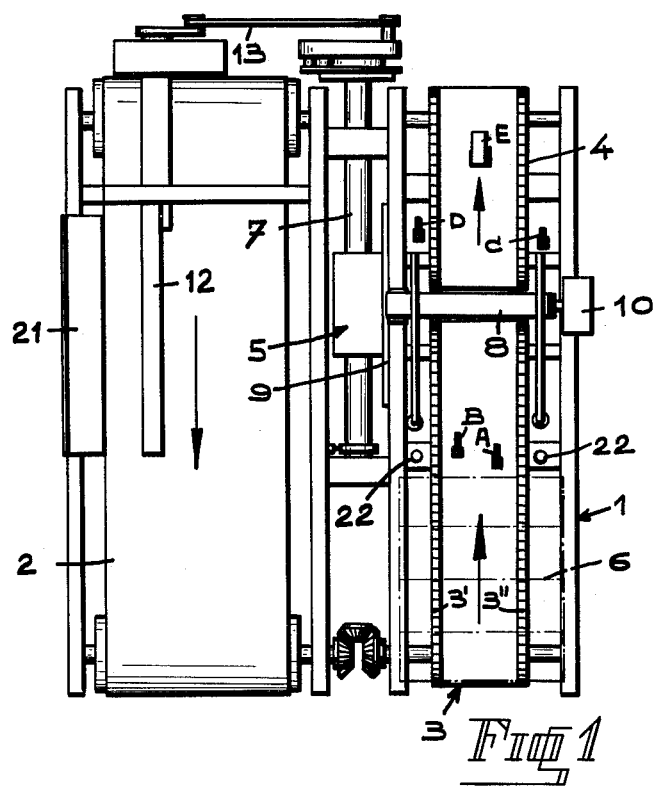
FIG. 1 is a plan view of the apparatus according to the present invention.

With reference to the drawings, 1 indicates a conveyance track for the delivery of the pans to be unloaded and for the discharge of the unloaded pans, and 2 indicates a conveyance track disposed beside the conveyance track 1. The conveyance track 1 is composed of a delivery conveyor 3 and a discharge conveyor 4, between which there is a turnover device 5. The pans to be unloaded are supplied in "couples" of four pans.

In the drawings one such couple 6 is indicated by dash-dotted lines. The delivery conveyor 3 consists of two chains 3' and 3" on which the couples 6 are supported. The turnover device 5 consists of an arm 8 which may swing upwardly and laterally with a shaft 7 disposed parallel to the direction of movement of the delivery conveyor 3. Adjacent the shaft 7 the arm 8 is provided with a fixed clamping jaw 9, and a second clamping jaw 10 mounted at the free end of the arm 8 may be moved towards and away from the jaw 9. When the arm 8 is swung upwardly, as shown in FIGS. 2 and 4, the movable clamping jaw 10 presses the couple of pans 6 against the fixed jaw 9, so that the couple is effectively held between the two jaws.

The bread loaves contained in the pans now fall upside down onto a receiving plate 12 which is turnable about an axis parallel to the shaft 7 and is coupled with the shaft 7 by means of a linkage system 13 so as to take a substantial horizontal position (indicated by dash-dotted lines in FIG. 2) when the turnover arm 8 is in its inverted position (indicated also by dash-dotted lines in FIG. 2). After the loaves have fallen out of the inverted pan couple the arm 8 and the unloaded pan couple return to the plane of the delivery conveyor 3 and the discharge conveyor 4. The movable clamping jaw 10 then releases the unloaded pan couple, so that the latter may be discharged by the discharge conveyor 4.

The movable clamping jaw 10 is mounted on a rod 14 which is slidably mounted in the arm 8 and is provided with a collar 15, against which bears one end of a compression spring 16, the other end of which bears against a collar 17 of the arm 8. A key 18 holds the rod 14 against rotation. The end of the rod 14 remote from the jaw 10 extends beyond the arm 8 and carries an adjustable abutment screw 19, which cooperates with a fixed abutment 20. When the arm 8 is swung upwardly by the shaft 7 the abutment screw 19 becomes free from the abutment 20 so that the rod 14 and the jaw 10 are moved towards the fixed jaw 9 due to the action of the compression spring 16, the pan couple being thus firmly clamped between the jaws 9 and 10 (FIG. 4). When the arm 8, after the loaves have fallen out, is swung back, the screw 19 engages the abutment 20 so that the rod 14 and the jaw 10 are pushed outwardly and the unloaded pan couple is released for discharge by means of the discharge conveyor 4.

At the moment the arm 8 of the turnover device 5 is swung from its inverted position back into its normal position the receiving plate 12 together with the loaves resting on it is swung to the position indicated in full lines, in which position the loaves are delivered to a guide or slide plate 21 and may slide along this plate laterally and in their upright positions onto the conveyor 2. After this the receiving plate 12 returns to its initial position (shown in dash-dotted lines) which position is reached at the moment the arm 8 is in its inverted position again with a following couple of pans.

As hereinafter explained the various movements may be automatically controlled by the pans which are delivered and discharged respectively.

When a pan couple is moving on the continuously driven delivery conveyor 3 towards the turnover device 5, at a certain moment it will depress the switch A, as a result of which the energizing circuit of the motor driving the turnover device 5 is interrupted. When the couple reaches its turnover position it depresses the switch D, as a result of which the circuit of the motor for driving the turnover device is closed and consequently the pan couple is swung upwardly, unloaded and swung back in the above described manner. It is to be noted that at the moment the switch D is actuated the switch A, which is in series with the switch D, is released.

At the moment the turnover arm 8 reaches its rest position again the switch D is depressed anew, due to which this switch opens and interrupts the motor circuit. The unloaded pan couple, which at this moment has become free from the jaws 9 and 10, is then discharged by the continuously driven discharge conveyor 4. On leaving the turnover zone the unloaded pan couple depresses a switch E which is in series with the switches A and D and prevents the driving motor of the turnover device 5 from being energized anew as long as there is still an unloaded pan couple engaging this switch, i.e., partially in the turnover zone. In a similar manner the switch A prevents the said drive motor from being energized as long as this switch is kept depressed by a couple of pans to be loaded, i.e., as long as this loaded pan couple has not yet completely arrived at the turnover station.

In order to prevent a following pan couple from entering into the turnover and unloading zone as long as a preceding pan couple is in this zone a blocking device is provided for holding said following pan couple back on the delivery conveyor 3. This blocking device consists of two spring loaded pins 22 which are normally pressed from the conveyance surface into the path of the pans to be unloaded so as to prevent delivery of further pans to the turnover and unloading zone. These blocking pins, however, may be held against spring action in their inoperative positions by means of electromagnets.

When a pan couple is entering into the turnover zone it closes the switch B, which is in series with the electromagnets associated with the blocking pins 22. After the couple has arrived completely or almost completely at the turnover position, whereby the switch B remains depressed, also the switch C is actuated, which is provided with a break contact in series with the switch B. As a result of this the electromagnets are deenergized so as to enable the blocking pins to enter into their operative positions. When now, by actuation of the switch D, the pan couple is swung upwardly by the arm 8, the switch C is closed, but at the same time the switch B is opened so that the energizing circuit of the electromagnets remains interrupted. After the arm and the unloaded pan couple are returned to their original position in the above described manner and the drive of the arm is switched off (as a result of the switch D being actuated anew) and the unloaded pan couple has been discharged from the turnover zone to such an extent that the switch B is no longer actuated and consequently opens, the blocking pins 22 remain in their operative positions. Only when the switch E is actuated a set of additional contacts of this switch shorts the switch B, so that the blocking pins are retracted to permit a following pan couple to enter into the turnover zone. In case of the discharge being stagnated, due to which an unloaded pan couple is not carried out of the turnover zone completely the switch C remains opened, so that the electromagnets stay deenergized (although the switch E closes) and no further couple is allowed to enter into the turnover zone.

Only the very first pan couple is not automatically allowed to enter into the turnover zone, as this couple is not preceded by a couple which can actuate the switch E. For that reason the switch E must be momentarily actuated manually so as to energize the electromagnets associated with the blocking pins.

The disclosed embodiment of the invention is representative of a presently preferred form of the invention but is intended to be illustrative rather than definitive thereof.

What I claim is:

1. An apparatus for depanning bread loaves comprising a delivery conveyor for the pans to be unloaded, a turnover platform in the path of this delivery conveyor adapted to move in a vertical plane perpendicular to the direction of movement of the delivery conveyor so as to be swung into a position above a discharge conveyor and means for putting the unloaded pans on a second discharge conveyor, the turnover platform being provided with means for laterally clamping the pans to be unloaded, said clamping means being constituted by a pair of cooperating jaws which are constructed to be normally urged away from each other against spring action but are moved towards each other as by spring action when the turnover platform is moving from its rest position, one of the jaws taking a fixed position on said platform whereas the second jaw at the opposite side of the platform is mounted on a transverse rod slidably mounted under the platform, the free end of said rod engaging an abutment when the platform is in its rest position, said abutment normally preventing the movable jaw from moving towards the fixed jaw but releasing said movable jaw when the platform is swung out of its rest position.

2. An apparatus according to claim 1, wherein the turnover platform is coupled with a loaf-turnover plate disposed above the discharge conveyor and adapted to be swung upward from a substantially horizontal loaf-receiving position corresponding with the inverted position of the platform into a delivery position for delivering loaves upon the discharge conveyor.

References Cited by the Examiner
UNITED STATES PATENTS

| 2,633,258 | 3/1953 | Temple et al. | 214—308 |
| 2,639,827 | 5/1953 | Otte | 214—308 |
| 2,709,013 | 5/1955 | Hartzog | 214—308 |
| 3,058,606 | 10/1962 | Chalich et al. | 214—308 |

HUGO O. SCHULZ, *Primary Examiner.*

GERALD M. FORLENZA, *Examiner.*

A. GRANT, *Assistant Examiner.*